United States Patent Office 3,257,774
Patented June 28, 1966

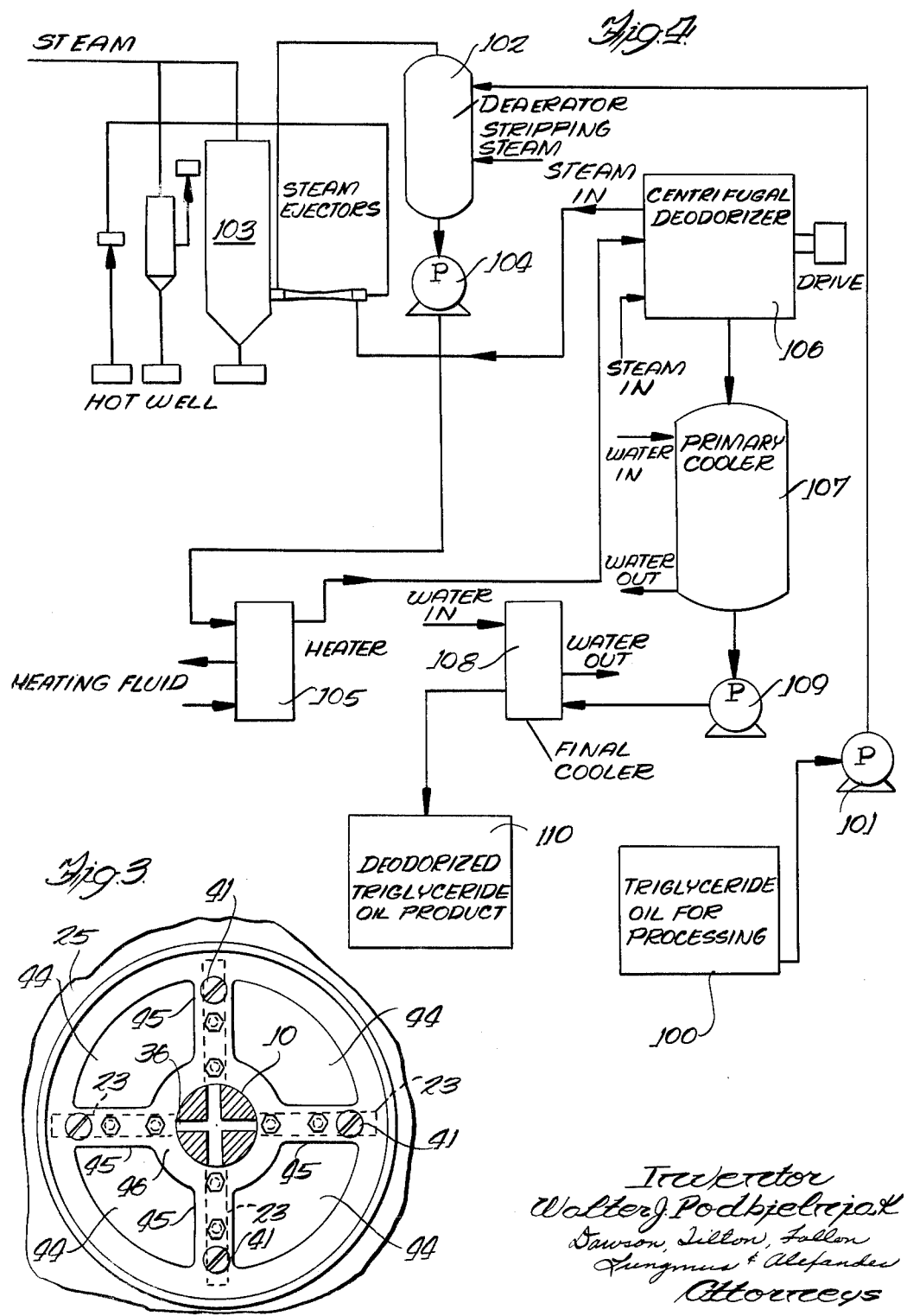

3,257,774
CENTRIFUGAL METHOD FOR DEODORIZING OILS
Walter J. Podbielniak, Chicago, Ill., assignor to Dresser Industries, Inc., Dallas, Tex., a corporation of Delaware
Filed July 30, 1963, Ser. No. 298,730
7 Claims. (Cl. 55—54)

This invention relates to a continuous centrifugal novel method of deodorization. More specifically in the method of this invention a triglyceride oil or fat is continuously contacted with steam while applying centrifugal force thereto. The deodorizing method of this invention and certain features thereof also have utility for the continuous countercurrent contacting of other liquids and gases.

This application is a continuation-in-part of application Serial No. 214,564, filed August 3, 1962, and entitled "Continuous Centrifugal Vapor-Liquid Contactor."

Triglyceride fats and oils of animal and vegetable origins, such as lard, soybean oil, cottonseed oil, corn oil, and the like, in being processed to improve their palatability, are subjected to a procedure known as deodorization. In this procedure the fat or oil is treated with steam under high vacuum to remove trace quantities of objectionable odor and flavor substances, thereby producing a bland, odorless product of the kind required by the industry for the manufacture of salad oils, shortenings, and margarine. Present day processing plants conduct deodorization operations at temperaturess between 400–500° F. and at absolute pressures of 1 to 6 mm. Hg. This combination of elevated temperature and high vacuum creates a number of problems which complicate the design of efficient and economical deodorization equipment.

Since the amount of material to be removed by deodorization is minute (0.1 to 0.2%), and the steam must be employed in very large volume relative to the fat or oil, entrainment loss of the valuable triglyceride material is difficult to avoid. In other words, the steam which is used to strip-out the trace quantities of free fatty acid and other volatile odor and flavor bodies, tends to remove some of the fat or oil as fine particles or droplets. This entrainment loss problem is particularly acute with continuous deodorization apparatus which otherwise should be the most efficient type of equipment for this operation. It has been estimated that as much as 30 to 40% of the cost of a continuous deodorization operation is due to product loss during the deodorization.

As previously stated, valuable triglyceride material is unintentionally removed by the steam due to entrainment. The contacting of the steam with the triglycerides at the high temperatures involved also causes another kind of oil loss. This is due to hydrolysis or partial hydrolysis of the triglycerides to free fatty acids. The fatty acids thus formed are removed with the steam as a volatile component. Such hydrolysis loss is directly related to contact time and temperature. It can be reduced by operating at lower temperatures (e.g., 400–425° F.), but this requires the use of lower absolute pressures and more efficient steam stripping. At the preferred temperatures of 450 to 475° F., it is desirable to have as short a contact time as possible while still achieving acceptable deodorization.

It is therefore an object of the present invention to provide a method of deodorization which reduces product loss due to entrainment and/or hydrolysis. A more specific object is to provide a continuous deodorization method which incorporates or includes means for separating the entrained triglyceride material before the steam is discharged from the deodorization apparatus. A further specific object is to provide a method of the character described which permits the contact time between the steam and triglyceride material to be reduced, thereby permitting the deodorization to be carried out at very high temperatures without significant hydrolysis loss. A further object is to provide a deodorization method which provides for more efficient contacting of the steam with the fat or oil. Another object is to provide a deodorization method which achieves the advantage of greater compactness. More generally, it is an object to provide a vapor-liquid contact apparatus having novel design features which can advantageously be applied to a wide variety of vapor-liquid contacting operations. Further objects and advantages will be indicated in the following detailed specification.

The present invention is shown in an illustrative embodiment in the accompanying drawings, in which:

FIG. 3 is a fragmentary end view of the assembled rotor, the shaft being shown in section, with the section taken through the liquid inlet passage; and FIG. 4 is a diagrammatic flow sheet illustrating an embodiment of the method of this invention.

Figure 1:
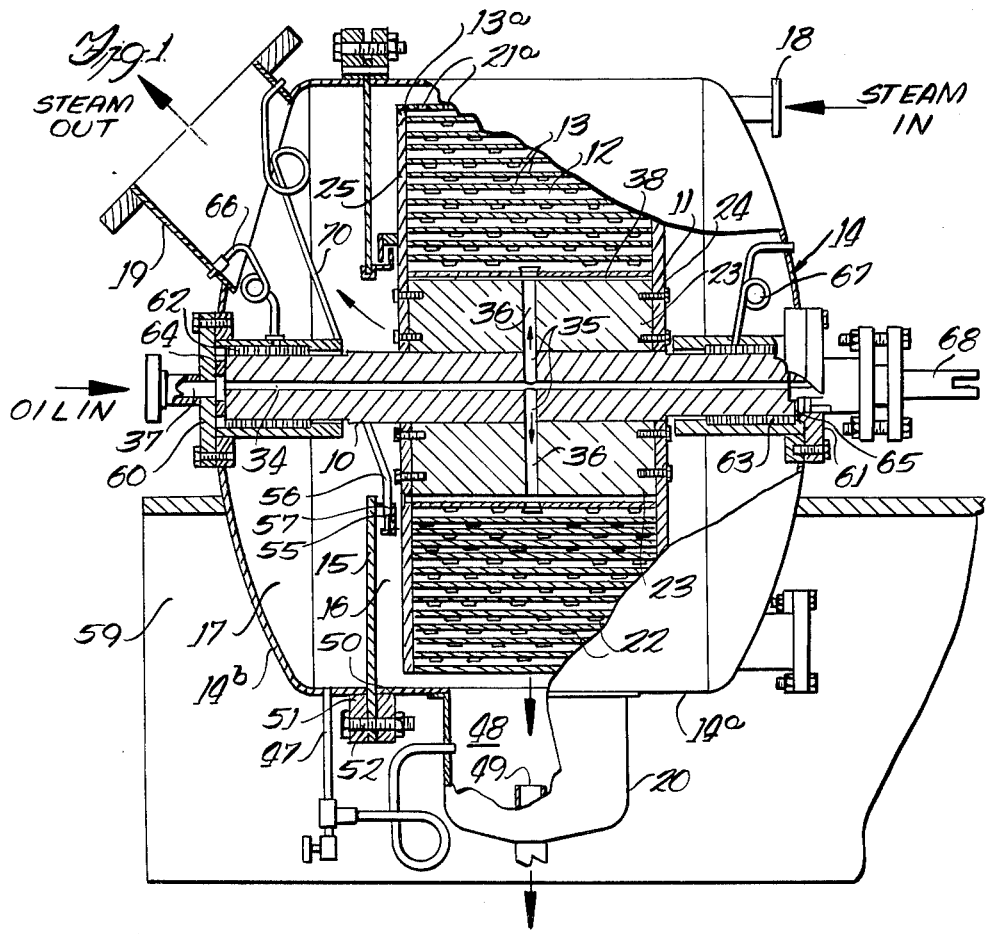
FIG. 1 is a sectional side elevational view of an apparatus embodying the features of the present invention.

Looking first at FIG. 1, there is shown a novel apparatus for the countercurrent contacting of a liquid and a gas such as steam and a triglyceride oil, while applying centrifugal force thereto. The apparatus includes a rotatably-supported shaft 10, and a cylindrical rotor 11 mounted coaxially on shaft 10 for rotation therewith. Preferably, shaft 10 and rotor 11 are supported for rotation about a horizontally-extending axis, as in the illustration of FIG. 1. The rotor 11 provides a contacting chamber 12 containing contacting elements 13 which provide radially-spaced walls having openings therethrough to permit gas to flow inwardly through rotor 11 while liquid flows outwardly.

In accordance with the present invention, there is provided a stationary casing 14 which encloses rotor 11 and the portion of shaft 10 on which the rotor is mounted. Preferably, casing 14 is in the form of a pressure-tight vessel which permits a pressure substantially lower (or higher) than atmospheric to be maintained within the interior of the vessel. There is also provided a partition means 15 which divides the interior of vessel 14 into two axially spaced zones 16 and 17. In the embodiment of FIG. 1, the partition means 15 is in the form of a vertically-extending disc, but other means can be employed. Rotor 11 is disposed within zone 16, and a gas or steam inlet means 18 is provided for supplying the gas to be contacted to the rotor zone 16 for passage from the outer portion of rotor 11 to the inner portion thereof. In the embodiment shown, inlet 18 is of relatively small size, being designed for the introduction of steam. For other gases where it is desired to minimize pressure drop at the inlet, means 18 can be employed. The rotor diameter can vary from 16 to 60 inches, although a diameter of about 40 to 50 inches is particularly desirable.

A gas or steam outlet means 19 communicates with the interior of chamber 17 for removing gas therefrom. The rotor 11 provides gas or steam discharge means, which will subsequently be described in detail, that extends from the inner portion of the rotor into steam exhaust chamber 17, as indicated by the arrows in FIG. 1. There is also provided a liquid or oil inlet means for supplying the liquid to be contacted to the interior of rotor 11. One form of liquid inlet means will also be subsequently described. The flow of the incoming liquid is also indicated by arrows in FIG. 1. There is also provided a liquid or oil outlet means 20 for removing liquid from chamber 16 after the liquid has passed through rotor 11.

Figure 2:
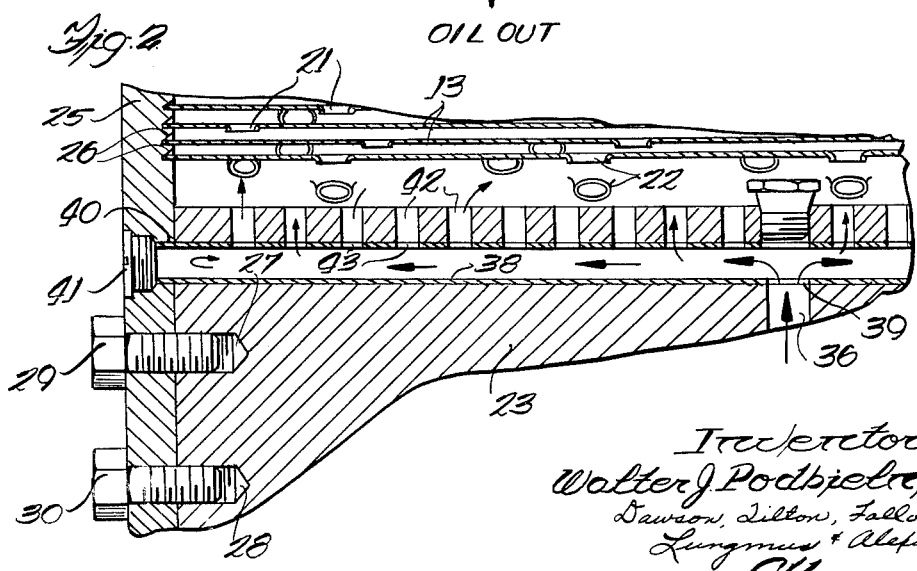
FIG. 2 is a fragmentary enlarged detail view taken on the same section as FIG. 1 and showing part of the liquid feed arrangement.

In the embodiment of FIG. 1, the radially spaced walls 13 of the contacting element means are provided by a plurality of axially-concentric rings or cylinders supported within rotor 11 and extending thereacross. Walls 13 can also be provided by spiral elements. As shown in FIG. 2, the rings 13 provide openings 21 which are dimensioned for countercurrent flow of liquid and gas through the same openings. For example, openings 21 can range from ⅛ inch to 2 inches in diameter. For the deodorization of a triglyceride material with steam, it is preferred to have openings 21 range from ¾ inch to 1½ inches in diameter, thereby avoiding any substantial steam pressure drop across the openings. The openings 21 can be arranged in various ways, but they are preferably distributed on rings 13 in axially and circumferentially spaced relation, that is, the perforations extend across the rings as well as around the circumference thereof. It is also preferred to position the openings in adjacent rings so that they are radially offset with respect to each other. In other words, a radial line extending perpendicularly to the axis of shaft 10 should not extend through openings in adjacent rings, since this might tend to promote channeling of the liquid and/or gas flows. In general, channeling tends to interfere with contact and stage efficiency, although in some applications some degree of channeling can be tolerated to obtain increased capacities or for other reasons. The offset or staggered relation of the openings 14 can be seen in FIG. 2.

When the apparatus of the present invention is employed for the steam deodorization of vegetable oils and fats, it is preferred to provide inwardly-projecting circumferentially-extending baffles around the inside of ring openings 21. The baffles are designed to cooperate with rings 13 so that the liquid, such as a vegetable oil, on the inside surface of the ring flows over the inwardly-projecting ends of the baffles to enter and pass through openings 21. As shown in FIG. 2, the circumferentially-extending baffle can be provided around opening 21 by turning the metal of ring 13 to form a lip 22. It will be understood that the baffle 22 can be formed in other ways and with other shapes providing it cooperates with the wall 13 in the manner previously described. The height of the baffle means can vary, but will usually fall within the range from ⅛ inch to ⅜ inch, as measured from the inner surface of ring 13 to the inner end of lip 22. In some applications, the baffle can be omitted. When such baffle means is employed, however, it is preferred to have the baffle or lip around each of the openings 21.

As shown in FIGS. 1 and 2, it is preferred to have the radially-spaced walls provided by rings 13 confined to a zone spaced outwardly from shaft 10, thereby leaving an annular space adjacent the shaft which is free of the contacting elements. In the illustration given, this annular space is divided into quadrants by four plates 23, which perform the function of anchor plates for securing the other components of the rotor 11 to shaft 10. Preferably, the innermost of the rings 13 is positioned outwardly from the central axis of shaft 10 by at least 20% of the rotor diameter.

Looking again at FIG. 1, it can be seen that rotor 11 includes two axially-spaced apart side plates 24 and 25. The concentric perforated rings 13 extend between the rings 24 and 25 and are supported thereby. The relationship between these parts is shown more clearly in FIG. 2. The ends of the rings 13 are received within grooves 26 which are formed on the inner walls of plates 24 and 25.

In the rotor assembly illustrated by the accompanying drawings, four anchor plates 23 are provided. Other numbers of anchor plates can be used, such as three or six plates, providing the principle of symmetry is used, as required for an apparatus rotating at high speed. The anchor plates 23 extend along shaft 10 between side plates 24 and 25 and project outwardly toward rings 13. The inner ends of anchor plates 23 are rigidly affixed to shaft 10. For example, this can be done by welding. With this construction, it is preferred to have side plates 24 and 25 detachably secured to the side portions of anchor plates 23, thereby permitting one or both side plates to be removed to obtain access to the interior of the rotor. In the illustration given, the side edges of plate 23 are drilled and tapped, as indicated in FIG. 2. The side plates 24 and 25 are drilled with openings in alignment with the threaded holes 27 and 28, and attachment bolts 29 and 30 are respectively extended into openings 27 and 28, as shown more clearly in FIG. 2.

With the construction described above, the shaft and anchor plates can provide communicating passages for introducing the liquid to be contacted into the interior of the rotor. However, other liquid feed means can be used. In the illustration given, shaft 10 provides an axially-extending passage 34 which connects with lateral passages 35, which in turn connect with the radially-extending passages 36 in the anchor plates 23. As shown in FIG. 1, shaft passage 34 communicates with a liquid inlet 37. After the liquid passes from shaft passage 34 through lateral passages 35, and anchor passages 36, the liquid enters distributor tubes 38 through an opening 39 therein, as seen in FIG. 2. Tubes 38 are received within axially extending bores 39 in the outer portions of plates 23. Side plate 25 provides openings 40 which are alignable with bores 39, as shown in FIG. 2. The outer portions of openings 40 are enlarged and threaded to receive retaining plugs 41. The outer ends of anchor plates 23 are provided with a plurality of openings 42 which align with openings 43 and tubes 39, as shown in FIG. 2.

As shown more clearly in FIG. 3, side plate 25 provides a plurality of gas discharge vents 44 through which the gas after passing inwardly through the contacting elements 13 is discharged to chamber 17 and thus passed to gas outlet 19. In the illustration given, the discharge vents 44 are quadrant-shaped, being formed in plate 25 between ribs 45 to which anchor plates 23 are connected. In the illustration given, the ribs 45 are integral with the rest of side plate 25 and connect to a hub portion 46 which is received on shaft 10. Preferably, the discharge vents 44 are located inwardly of the zone of the contacting elements, such as the rings 13. It is also preferred that the feed liquid is introduced into the rotor at points outwardly beyond the vents 44, although this is not highly critical since the feed liquid will be thrown radially outwardly due to the centrifugal force. In the event any of the liquid passes into chamber 17 through vents 44 or by other means, the chamber 17 can be provided with a valve-controlled liquid drain pipe 47. After passing outwardly through the rings 13, the liquid is discharged through openings 21a in an outer ring 13a, as shown in FIG. 1. It will be noted that the openings 21a are not provided with baffles, and therefore the liquid does not tend to accumulate on the inside surface of the ring 13. The ends of plate 13a are received over the peripheral edges of side plates 24 and 25 and are detachably bolted thereto.

After being discharged from the rotor, the oil runs down the walls of chamber 16 and accumulates in a well or sump 48, as seen in FIG. 1. Sump 48 is provided with a standpipe 49 which maintains a liquid level in the sump. It will be understood that standpipe 49 is connected to a suitable discharge pipe, and that the discharge pipe is provided with a suitable valve. Drain pipe 47 connects to sump 48 above the level of standpipe 49.

It is preferred to construct vessel 14 as illustrated in FIG. 1, although other constructions can be used. In the embodiment shown, vessel 14 is formed of two parts, a larger part 14a on one side of partition 15 and enclosing rotor zone 16, and a smaller removable cover part 14b on the other side of partition 15 enclosing chamber 17. The meeting vessel parts can be provided with attachment means for forming a sealed connection therebetween. In the illustration given, as shown in FIG. 1, the vessel parts 14a and 14b are respectively provided with annular flanges 50 and 51 which are clamped together by means of suitable bolts 52. The outer peripheral portion of partition wall 15 extends between flanges 50 and 51, and suitable gasket rings are provided to assure a pressure-tight seal when the parts are clamped together. This construction also provides mechanical support for the partition means.

In order to provide a more complete separation between chambers 16 and 17 and to permit a slight pressure differential to be maintained between these chambers, it is preferred to provide a dynamic centrifugal liquid seal between partition 15 and rotor side plate 25. For example, in the illustration given, an annular trough 55 is mounted on the outside of plate 25, as shown in FIG. 1 The inner end portion of partition 15 is provided with a sealing ring 56 which has an outwardly-extending portion 57 that extends into trough 55. Appropriate passage means is provided for supplying trough 55 with liquid during the operation of the apparatus. The liquid will be held in the trough 55 by centrifugal force, and the ring 56 will cooperate therewith in providing a dynamic seal. A liquid supply line 70 can be arranged to continuously or intermittently discharge into trough 55. For example, deodorized oil can be pumped through line 70 to provide the liquid seal. While the sealing arrangement described above is preferred, other types of seals can be used, such as close clearance seals or labyrinth seals.

It will be understood that the stationary casing or vessel 14 will be provided with a suitable external mounting to hold it rigidly during the operation of the apparatus. For example, vessel 14 can be mounted on a base support 59, as indicated in FIG. 1.

It will also be understood that shaft 10 must be provided with suitable bearings, and with a liquid seal for introducing the liquid. In the illustration given, shaft 10 is supported by the walls of vessel 14. There is provided support and bearing assemblies 60 and 61 which include sleeve bearings 62 and 63, respectively. The assemblies also include thrust bearings 64 and 65. Seals are also provided in combination with the bearing assemblies. To provide for lubrication of these bearings during the deodorization of vegetable oils and fats, previously deodorized liquid triglycerides can be pumped to the bearings through lines 66 and 67. Any lubricant leaking past the bearings into either chamber 16 or 17 will not contaminate the material being processed. A drive connection 68 is provided in association with bearing mounting 65 and the drive shaft is mounted in a suitable bearing. It will be understood that shaft 68 will be connected to a suitable source of mechanical power for driving the shaft and rotor at speeds of 500 to 1,000 r.p.m. The seal and bearing arrangement illustrated in FIG. 1 is especially adapted for treating triglyceride oils. Where other liquids are being treated which have no lubricating properties, separate seals and bearings will be used, and other means provided for lubricating the bearings.

OPERATION

As previously indicated, the method of this invention is particularly adapted for the deodorizing of triglyceride oils or fats such as vegetable oils and animal fats like cottonseed oil, soybean oil, corn oil, lard, etc. The term "triglyceride oil" as used herein is intended to be generic to both oils and fats. In this application, the triglyceride material to be deodorized, preferably after refining, drying and deaeration, is introduced to the rotor through inlet 37 and the connecting passages previously described. A rotor speed of 500 to 1,000 r.pm. can be used, while speeds of 500–700 r.p.m. are preferred. This will create centrifugal force causing the triglyceride material discharged from tubes 38 to flow outwardly through the rings 13 within the rotor chamber. Where the ring openings 21 are provided with the baffles, as preferred, the triglyceride material will form layers on the inside of the rings, the level being maintained by the height of the baffles 22. Preferably, the triglyceride material is heated to substantially operating temperature before being introduced into the rotor (e.g., at a temperature of from 400 to 550° F.). In a preferred application, the triglyceride is introduced at a temperature of from 450 to 535° F., and the rotor is also operated at a temperature within this range.

The interior of vessel 14 is maintained at a high vacuum by the connection of suitable vacuum equipment to a steam outlet 19. For example, a three stage steam ejector can be used to create the desired vacuum. For deodorization, the applied vacuum will usually be within the range from 1 to 6 mm. Hg. The pressure within chamber 17 will be substantially the same as that applied through steam outlet 19, and the pressure in chamber 16 will be only slightly higher (viz., 0.5–1.5 mm. Hg higher). For example, with steam ejectors creating a vacuum of 4 mm. Hg, the pressure within chamber 17 will be substantially 4 mm. Hg, while the pressure within chamber 16 will be only slightly higher (e.g., 5–6 mm. Hg). In other words, the total pressure drop from chamber 16 through rotor 11 to chamber 17 will not be over a few millimeters of mercury. In any event, the contacting of the steam and oil within chamber 17 should be at a vacuum with the range from 1–10 mm. Hg, and preferably at about 3–8 mm. Hg.

In the operation of the apparatus, steam is supplied to chamber 16 through inlet 18. The steam is preferably superheated, but saturated steam can also be used. The pressure and temperature of the steam will be regulated to obtain the desired operating temperature. It will be understood that the temperature and pressure of the incoming steam should be controlled to maintain the desired operating temperature within chamber 16. The quantity of steam relative to the triglyceride material can be relatively small. For example, from 0.015 to 0.06 lb. of steam per pound of oil can be used, while from .02 to .04 lb. are preferred.

Within the annular spaces between rings 13, the triglyceride material will be brought into intimate contact with the countercurrently flowing steam. The triglyceride material will be dispersed, collected, and redispersed repeatedly in the steam atmosphere, thereby obtaining an intimate contact between the triglyceride material and the steam. Moreover, the swirl and rotational turbulence of the layers of triglyceride material on the inside of the rings 13 will tend to form a froth or foam with the steam, which will further promote the intimate contacting as the oil flows from ring to ring. Effective contacting and high stage efficinecy can thereby be achieved. Since the contacting operation is carried out under the application of centrifugal force, the high contact efficiency is not obtained at the expense of oil loss by entrainment. As the steam moves inwardly toward shaft 10 carrying the volatile materials which have been removed from the oil or fat, any entrained droplets or particles of liquid triglyceride material are thrown outwardly by centrifugal force, and thus separated from the steam before it is discharged through vents 44 into chamber 17 and through steam outlet 19. This separating action is facilitated by providing the annular space around shaft 10 which is free from the contacting elements 13. In other words, this annular space acts as a separating zone, which tends to still further reduce entrainment loss.

Because of the high contacting efficiency, the residence time of the triglyceride material within the apparatus can be very short. Triglyceride material will therefore be exposed to the steam and high temperatures for a shorter period of time than with conventional deodorization apparatus, and this will tend to reduce the hydrolysis loss. For example, the contacting time of the oil within the deodorizer apparatus may range from 1–6 minutes, and is preferably less than 5 minutes. The optimum contacting time is believed to be about 2–3 minutes.

As can be seen from the foregoing discussion, this invention involves a process for deodorizing a triglyceride oil which is characterized by the steps of establishing and maintaining an atmosphere of steam within an enclosed space while the space is being rotated about an axis to develop a centrifugal force field, introducing the triglyceride oil into a radially inner portion of the space, and dispersing the oil in the steam atmosphere in a plurality of radially spaced contacting zones as the oil passes outwardly under the influence of the centrifugal force field, the oil being sequentially and repeatedly dispersed and collected. The operating conditions for the process, such as pressures, temperatures, and contacting times, have already been discussed. In the preferred embodiment of the process, the contacting will be carried out continuously, and the steam atmosphere will be maintained by contiuously introducing steam into a radially outer portion of the enclosed space and continuously removing steam from a portion of the space adjacent the axis and radially inwardly of the portion of the position at which the oil is introduced. Preferably, the oil is introduced in an inner portion of the space but at a position spaced outwardly from the axis.

For a complete deodorization plant layout, it will be understood that other process units and apparatus will be employed in conjunction with the deodorizer. A suitable plant layout is illustrated in the diagrammatic flow sheet of FIG. 4. In this flow sheet, the triglyceride oil to be deodorized is passed from storage at 100 by means of a pump 101 to a deaerator 102, wherein the oil is subjected to stripping steam for the removal of air. The deaerator is maintained under high vacuum by connection to a series of steam ejectors 103. The deaerated oil is passed by means of pump 104 through a heater 105 to the deodorizer 106, which is constructed in accordance with the deodorizer apparatus heretofore described. After deodorization, the oil is passed to a primary cooler 107 where the temperature of the oil is rapidly reduced and then through a final cooler 108 by means of a pump 109 before being passed to storage at 110. The deodorizer is also connected to the steam ejectors 103 for maintaining the high vacuum and for removal of the steam.

The method and apparatus of this invention are further illustrated by the following specific examples, which are set forth by way of illustration rather than limitation.

*Example 1*

Coconut oil was subjected to continuous deodorization in an apparatus like the one previously described herein, and illustrated by FIGS. 1–3. The coconut oil before deodorization had a 1.0 red color (Lovibond) and 0.6% free fatty acid (F.F.A.). The oil was deaerated and heated to a temperature of 450° F. The oil at this temperature was pumped through the deodorizer apparatus at a rate of 3600 lbs./hr., and steam was applied to the apparatus at a rate of approximate 85 lbs./hr. A vacuum of approximately 2 mm. Hg was applied to the apparatus. The rotor speed was approximately 600 r.p.m.

The deodorized oil had a "good" flavor, as judged on a rating scale of "good," "passable," and "rejectable." The peroxide value of the oil was nil, while the color of the oil was substantially unchanged, being 1.1 on the same color scale. The F.F.A. content of the oil was reduced to .005% by weight.

*Example 2*

A margarine oil, consisting of a mixture of hydrogenated soybean oil and cottonseed oil, was subjected to continuous deodorization by a similar procedure to that described in Example 1. The initial red color of the margarine oil was 2.1, and the initial F.F.A. was .10%. The oil was supplied to the deodorizer at a rate of approximately 3800 lbs./hr. and a temperature of about 4657 F. Steam was supplied to the apparatus at a rate of about 120 lbs./hr. The applied vacuum was 4 mm. Hg, so that the pressure within the contacting chamber was within the range from 4 to 6 mm. Hg. The rotor was operated at about 590 r.p.m.

The deodorized margarine oil achieved the highest flavor score (good), and had an insignificant peroxide value. The color was improved, being measured at 1.4 red color on the same scale, while the F.F.A. was reduced to .03%.

*Example 3*

Following the general procedure of Examples 1 and 2, refined cottonseed oil, having a red color of 3.2 and an F.F.A. of .12%, was subjected to deodorization. The oil feed rate was approximately 3800 lbs./hr., and the feed temperature was 460° F. Steam was supplied at the rate of approximately 115 lbs./hr., and the applied vacuum was 6 mm. Hg. The rotor speed was about 600 r.p.m. The flavor of the product was good and the peroxide value was nil. The color was substantially unchanged at a red color value of 3.0, while the F.F.A. was reduced to .02%.

*Example 4*

Crude coconut oil was deodorized by a similar procedure to that of the preceding examples. The oil had an initial F.F.A. of 6.8%. The oil was pumped to the deodorized at a temperature of 470° F. at a rate of about 400 lbs./hr. Steam was supplied at about 110 lbs./hr., while the applied vacuum was 4 mm. Hg. The F.F.A. of the product was reduced 0.35%.

While in the foregoing specification this invention has been described in relation to specific preferred embodiments thereof and many details have been set forth for purpose of illustration, it will be aparent to those skilled in the art that the invention is susceptible to other embodiments and that many of the details set forth herein can be varied considerably without departing from the basic constructional features of the apparatus. It will also be apparent that the apparatus can be used for many kinds of liquid-vapor contacting operations in addition to its use as a deodorizer. For example, it can be used for treating air with liquid treating agents, such as the cooling of air by contact with water, the drying of air by contact with a hygroscopic liquid, the sterilizing of air by contact with a bactericidal liquid, etc. It can also be used for steam stripping of residual alcohol or other organic solvent from plasticizers down to desired level of 5–10 p.p.m. of residual solvent. Other applications include gas absorption processes for removal of contaminants from natural gas, such as the use of ethanolamine or an alkaline salt solution to remove $H_2S$ and $CO_2$, etc. In such applications, it will be understood that the construction and arrangement of the seals, bearings, inlets, etc., can be varied as required.

I claim:

1. A process for deodorizing a triglyceride oil, comprising introducing steam into an enclosed cylindrical space, maintaining an atmosphere of steam within said enclosed space at a pressure within the range from 1 to 10 mm. Hg absolute, rotating said space about its axis and developing a centrifugal force field therein from said rotation introducing a triglyceride oil containing volatile odor bodies into a radially inner portion of said space at a temperature within the range from 400–550° F., impelling said oil outwardly under the influence of said rotationally developed centrifugal force field, and dispersing said oil in said steam atmosphere at a plurality of radially spaced contacting zones as said oil passes outwardly and said steam passes inwardly, said oil being sequentially and repeatedly dispersed as a foam and collected as a liquid.

2. The process of claim 1 wherein said enclosed space is at a pressure of about 3–8 mm. Hg, and wherein said triglyceride oil is at a temperature of about 450–535° F.

3. A process for deodorizing a triglyceride oil, comprising introducing steam into an enclosed cylindrical space, maintaining an atmosphere of steam within said enclosed space at a pressure within the range from 1–10 mm. Hg absolute, rotating said space about its axis and developing a centrifugal force field therein from said rotation introducing a triglyceride oil containing volatile odor bodies into a radially inner portion of said space at a temperature within the range from 400–550° F., impelling said oil outwardly under the influence of said rotationally developed centrifugal force field, dispersing said oil in said steam atmosphere at a plurality of radially spaced contacting zones as said oil passes outwardly and said steam passes inwardly, said oil being sequentially and repeatedly dispersed as a foam and collected as a liquid, and removing the deodorized oil from said enclosed space after said oil has been contacted with said steam, said deodorized oil being removed from an outer portion of said space after having been maintained in said enclosed space for less than five minutes.

4. The process of claim 3 wherein said enclosed space is at a pressure of about 3–8 mm. Hg, and wherein said triglyceride oil is at a temperature of about 450–535° F.

5. A process for deodorizing a triglyceride oil, comprising maintaining an atmosphere of steam within an enclosed cylindrical space at a pressure within the range from 1 to 10 mm. Hg absolute, rotating said space about its axis and developing a centrifugal force field therein from said rotation, said steam atmosphere being maintained by continuously introducing steam into a radially outer portion of said space and continuously removing steam from a portion of said space adjacent said axis, introducing a triglyceride oil containing volatile odor bodies into a radially inner portion of said space at a temperature within the range from 400–550° F., impelling said oil outwardly under the influence of said rotationally developed centrifugal force field, said oil being introduced at a position radially outward of the point of removal of said steam, and dispersing said oil in said steam atmosphere at a plurality of radially spaced contacting zones as said oil passes outwardly, said oil being sequentially and repeatedly dispersed as a foam and collected as a liquid.

6. The process of claim 5 wherein said enclosed space is at a pressure of about 3–8 mm. Hg, and wherein said triglyceride oil is at a temperature of about 450–535° F.

7. A continuous process for deodorizing a triglyceride oil, comprising maintaining an atmosphere of steam within an enclosed cylindrical space at a pressure of about 3–8 mm. Hg absolute, rotating said space about its axis and developing a centrifugal force field therein from said rotation, said steam atmosphere being maintained by continuously introducing steam into a radially outer portion of said space and continuously removing steam from a radially inner portion thereof, continuously introducing a triglyceride oil containing volatile odor bodies into a radially inner portion of said space at a temperature of about 450–535° F., impelling said oil outwardly under the influence of said rotationally developed centrifugal force field, said oil being introduced at a position outwardly of the point of removal of said steam, dispersing said oil in said steam atmosphere at a plurality of radially spaced contacting zones as said oil passes outwardly, said oil being sequentially and repeatedly dispersed as a foam and collected as a liquid, and continuously removing the deodorized oil after being contacted with said steam from the radial outward portion of said space, said oil being maintained in said enclosed space for less than five minutes.

References Cited by the Examiner
UNITED STATES PATENTS

| | | | |
|---|---|---|---|
| 928,118 | 7/1909 | Fowler | 261—89 |
| 1,002,810 | 5/1911 | Latta | 261—85 |
| 1,943,146 | 1/1934 | Rust | 55—54 |
| 2,003,454 | 6/1935 | Murray | 55—55 |
| 2,136,774 | 11/1938 | Hickman | 55—55 |
| 2,452,716 | 8/1945 | Bergquist | 55—54 |
| 2,670,132 | 2/1954 | Podbielniak. | |
| 2,722,505 | 11/1955 | Faulkner | 260—428 |
| 3,129,076 | 4/1964 | DeSmet | 55—38 |

REUBEN FRIEDMAN, *Primary Examiner.*